US011791071B2

(12) United States Patent
Hughes et al.

(10) Patent No.: US 11,791,071 B2
(45) Date of Patent: Oct. 17, 2023

(54) TEE ARRESTER WITH DIRECTIONAL VENTING

(71) Applicant: Hubbell Incorporated, Shelton, CT (US)

(72) Inventors: David Charles Hughes, Aiken, SC (US); Bastiaan Hubertus van Besouw, Strongsville, OH (US)

(73) Assignee: Hubbell Incorporated, Shelton, CT (US)

(*) Notice: Subject to any disclaimer, the term of this patent is extended or adjusted under 35 U.S.C. 154(b) by 0 days.

(21) Appl. No.: 18/093,656

(22) Filed: Jan. 5, 2023

(65) Prior Publication Data

US 2023/0145027 A1 May 11, 2023

Related U.S. Application Data

(63) Continuation of application No. 17/175,056, filed on Feb. 12, 2021, now Pat. No. 11,551,836.

(60) Provisional application No. 62/976,035, filed on Feb. 13, 2020.

(51) Int. Cl.
*H02H 1/00* (2006.01)
*H01C 7/12* (2006.01)

(52) U.S. Cl.
CPC .................................... *H01C 7/12* (2013.01)

(58) Field of Classification Search
CPC .. H01R 13/53; H01R 13/443; H01R 13/6666; H01C 7/12; H01T 4/06
USPC .......................................................... 361/127
See application file for complete search history.

(56) References Cited

U.S. PATENT DOCUMENTS

| | | | |
|---|---|---|---|
| 3,980,374 | A | 9/1976 | Fallot |
| 4,161,012 | A | 7/1979 | Cunningham |
| 4,700,258 | A | 10/1987 | Farmer |
| 5,088,001 | A | 2/1992 | Yaworski et al. |
| 6,225,567 | B1 | 5/2001 | Kester |
| 8,018,707 | B2 | 9/2011 | Yaworski et al. |

(Continued)

FOREIGN PATENT DOCUMENTS

| | | |
|---|---|---|
| EP | 2876756 | 5/2015 |

OTHER PUBLICATIONS

PCT/US2021/017905 International Search Report and Written Opinion dated Jul. 14, 2021 (23 pages).

*Primary Examiner* — Jared Fureman
*Assistant Examiner* — Lucy M Thomas
(74) *Attorney, Agent, or Firm* — Michael Best & Friedrich LLP

(57) ABSTRACT

A surge arrester device comprising a first housing portion including a first end and a second end, the first end including a first opening and the second end including a second opening. The device includes a first axis parallel to the first housing portion, the first axis intersecting a first center of the first opening and a second center of the second opening, and a second axis perpendicular to the first housing portion, the second axis intersecting an intermediate section of the first housing portion. The device includes a second housing portion protruding from the intermediate section of the first housing portion, the second housing portion protruding at an angle between the first axis and the second axis, and a metal oxide varistor (MOV) stack within the second housing portion, wherein the MOV stack is released through an opening of the second housing portion if the arrester faults to ground.

20 Claims, 2 Drawing Sheets

(56) References Cited

U.S. PATENT DOCUMENTS

| | | | |
|---|---|---|---|
| 8,328,569 | B2 | 12/2012 | Roscizewski et al. |
| 9,728,307 | B2 | 8/2017 | Luzzi et al. |
| 2007/0293073 | A1* | 12/2007 | Hughes ............ H01H 33/66207 439/186 |
| 2009/0215299 | A1 | 8/2009 | Hughes et al. |
| 2016/0336749 | A1 | 11/2016 | Barker et al. |
| 2017/0229828 | A1 | 8/2017 | Hughes |
| 2018/0075953 | A1 | 3/2018 | Boese et al. |
| 2019/0107563 | A1 | 4/2019 | Siebens |

* cited by examiner

Fig. 1
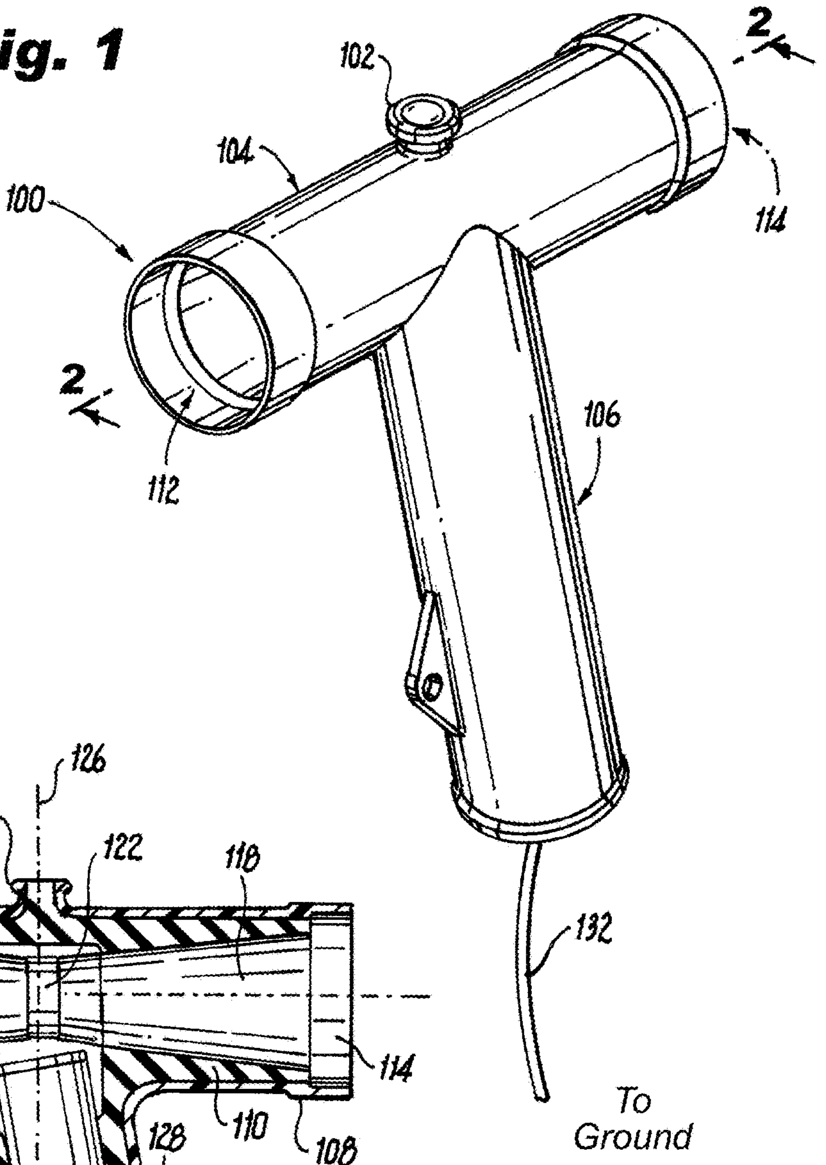
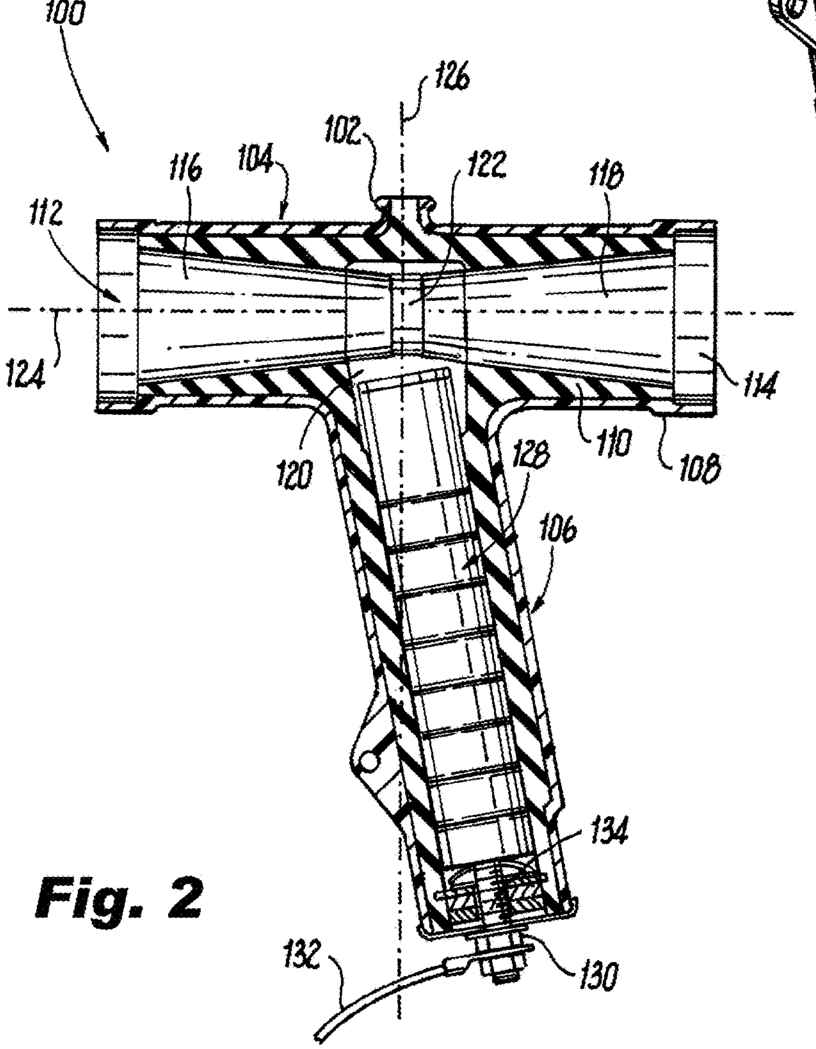
Fig. 2

TEE ARRESTER WITH DIRECTIONAL VENTING

CROSS REFERENCE TO RELATED APPLICATIONS

This application is a continuation of U.S. patent application Ser. No. 17/175,056, filed Feb. 12, 2021, which claims the benefit of U.S. Provisional Patent Application No. 62/976,035, filed Feb. 13, 2020, the entire content of which is hereby incorporated by reference.

FIELD

The present disclosure relates to overvoltage protection assemblies, and more specifically, to tee-shaped surge arresters.

SUMMARY

Surge arresters are commonly used to protect underground high voltage electrical systems from power surges. Surge arresters include metal oxide varistor elements to provide a low or high impedance path depending on the voltage of the power system. During normal operation, the metal oxide varistor element has a high impedance, resulting in little current flowing through the surge arrester. However, if a power surge occurs, such as a surge resulting from a lightning strike, the impedance of the metal oxide varistor decreases. Surge current flows through the arrester to protect other components of the power system. However, the surge arrester may fail, creating an undesirable low impedance fault. If the surge arrester fails, then power frequency fault current flows through the arrester to ground. In this case the failed surge arrester is said to have faulted to ground. Surge arrester failures faulting to ground may be dangerous occurrences, as the fault current generates hot gasses, plasma, and electrical arcs, which are expelled from the device.

The current disclosure provides for a surge arrester that directs expulsion of MOV disks, gasses, and plasma away from potential human operators. A portion of the surge arrester may be angled such that the MOV disks, gasses, and plasma may be directed towards a wall, container, or the like.

In one embodiment, a surge arrester device comprises a first housing portion including a first end and a second end, the first end including a first opening and the second end including a second opening. The device includes a first axis parallel to the first housing portion, the first axis intersecting a first center of the first opening and a second center of the second opening, and a second axis perpendicular to the first housing portion, the second axis intersecting an intermediate section of the first housing portion. The device includes a second housing portion protruding from the intermediate section of the first housing portion, the second housing portion protruding at an angle between the first axis and the second axis, and a metal oxide varistor (MOV) stack within the second housing portion. The MOV stack is released through an opening of the second housing portion if the arrester faults to ground.

In some embodiments, the second housing portion includes a first end coupled to the first housing portion and a second end, the second end including the opening of the second housing portion. In some embodiments, the opening of the second housing portion includes a cap coupled to a group. In some embodiments, the surge arrester device is a tee-shaped surge arrester. In some embodiments, the surge arrester device is one selected from a group consisting of a tee arrester, a deadfront arrester, a lightning arrester, a bushing arrester, a 200 A loadbreak arrester, and a 600 A deadbreak arrester. In some embodiments, the surge arrester device includes an elastomeric primary insulation. In some embodiments, the first housing portion further includes a plug interface configured to receive an insulating plug via the first opening, and a bushing interface configured to receive a bushing via the second opening. In some embodiments, the insulating plug is integrated within the first housing portion. In some embodiments, the bushing is a transformer bushing of a transformer. In some embodiments, the transformer is one selected from a group consisting of a feedthrough transformer, a vault transformer, a pad-mounted transformer, a direct-buried transformer, and a submersible transformer. In some embodiments, the second housing portion protrudes at a 20° angle from the second axis. In some embodiments, the fault to ground condition is the result of a fault current within the surge arrester device being greater than a current threshold.

Another embodiment provides a high voltage electrical system. The high voltage electrical system comprises a transformer including a front plate, a plurality of connectors, and a plurality of arresters. Each of the plurality of connectors is coupled to an electrical phase of a plurality of electrical phases. Each of the plurality of arresters is coupled to one of the plurality of connectors, and a housing portion of each arrester of the plurality of arresters is angled towards the front plate.

In some embodiments, the plurality of electrical phases includes a first electrical phase, a second electrical phase, and a third electrical phase. In some embodiments, the plurality of connectors includes a first connector coupled to the first electrical phase, a second connector coupled to the second electrical phase, and a third connector coupled to the third electrical phase. In some embodiments, the plurality of arresters includes a first arrester coupled to the first connector, a second arrester coupled to the second connector, and a third arrester coupled to the third connector. In some embodiments, each electrical phase of the plurality of electrical phases is separated by a phase angle of approximately 120°. In some embodiments, each of the plurality of arresters includes a metal oxide varistor (MOV) stack, wherein the MOV stack is released through an opening of the housing portion based on a fault to ground condition. In some embodiments, the fault to ground condition is the result of a fault current within the respective surge arrester being greater than a current threshold. In some embodiments, each of the plurality of arresters is one selected from a group consisting of a tee arrester, a deadfront arrester, a lightning arrester, a bushing arrester, a 200 A loadbreak arrester, and a 600 A deadbreak arrester. In some embodiments, the transformer is one selected from a group consisting of a feedthrough transformer, a vault transformer, a pad-mounted transformer, a direct-buried transformer, and a submersible transformer. In some embodiments, an opening of the housing portion includes a cap coupled to a ground.

Other aspects of the application will become apparent by consideration of the detailed description and accompanying drawings.

BRIEF DESCRIPTION OF THE DRAWINGS

FIG. 1 illustrates a perspective view of a surge arrester, according to some embodiments.

FIG. 2 illustrates a cross-sectional side view of the surge arrester of FIG. 1, according to some embodiments.

DETAILED DESCRIPTION

Figure 3:
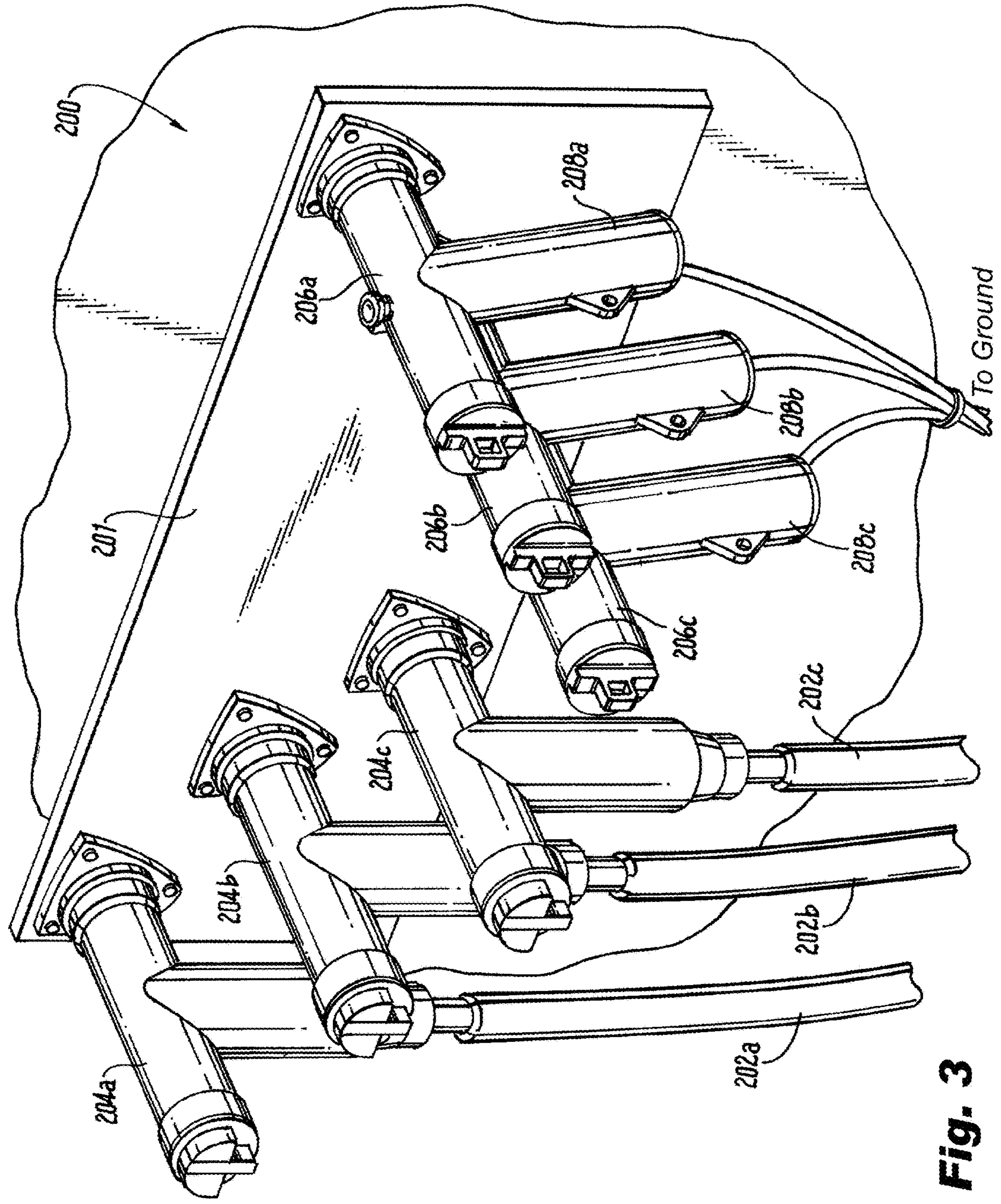
FIG. 3 illustrates a transformer power system, according to some embodiments.

Before any embodiments of the application are explained in detail, it is to be understood that the application, and the devices and method described herein, are not limited in their application to the details of construction and the arrangement of components set forth in the following description or illustrated in the following drawings. The devices and methods in this application are capable of other embodiments and of being practiced or of being carried out in various ways.

FIGS. 1 and 2 illustrate a surge arrester 100 (e.g., a tee arrester, a deadfront arrester, a lightning arrester, a bushing arrester, a 200 A loadbreak arrester, a 600 A deadbreak arrester, or the like) according to some embodiments. The surge arrester 100 includes a housing 102 that includes a first housing portion 104 and a second housing portion 106. The housing 102 may be composed of an insulating material to protect external equipment and workers from high voltages that may be present within the surge arrester 100. For example, the housing 102 includes an elastomeric conductive shell 108 and an elastomeric primary insulation 110. The elastomeric conductive shell 108 may be composed of, for example, a conducting EPDM. The elastomeric primary insulation 110 may be composed of, for example, an insulating EPDM. In some embodiments, all components other than electrical connection points may be insulated such that they are electrically shielded.

The first housing portion 104 includes a first opening 112 at a first end of the first housing portion 104 and a second opening 114 at a second end of the first housing portion 104. The first housing portion 104 includes a plug interface 116 configured to receive an insulating plug, reducing tap plug, reducing tap well, or connecting plug via the first opening 112. In some embodiments, the insulating plug, reducing tap plug, reducing tap well, or connecting plug is integrated within the arrester housing 104, such that there is no opening 112 or interface 116 and the plug and housing are molded as one unit. The first housing portion 104 includes a bushing interface 118 configured to receive a bushing via the second opening 114. The bushing may be, for example, a 600 A standard shaped bushing. The bushing may be configured to couple the surge arrester 100 with an underground power system, such as a 15 kV, 25 kV, 28 kV, or 35 kV underground system. The first housing portion 104 also includes an elastomeric conductive insert 120 and a metallic connector spade 122. The metallic connector spade 122 couples the plug interface 116 to the bushing interface 118. Additionally, should an insulating plug be located within the plug interface 116, the insulating plug may couple to a bushing within the bushing interface 118 via the metallic connector spade 122.

The first housing portion 104 includes a longitudinal (e.g., first) axis 124 parallel to the first housing portion 104. The longitudinal axis 124 passes through the first housing portion 104, intersecting the first housing portion 104 at a center of the first opening 112 and at a center of the second opening 114. The first housing portion 104 further includes a latitudinal (e.g., second) axis 126 perpendicular to the longitudinal axis 124. The latitudinal axis 126 intersects the first housing portion 104 at an intermediate section of the first housing portion 104.

The second housing portion 106 protrudes from the intermediate section of the first housing portion 104 and includes a metal oxide varistor (MOV) stack 128 and a ground connection assembly 130 coupled to a system ground 132. The second housing portion 106 protrudes from the first housing portion 104 at an angle between the longitudinal axis 124 and the latitudinal axis 126. For example, the second housing portion 106 may protrude from the first housing portion 104 at a 20° angle form the latitudinal axis 126. The first housing portion 104 and the second housing portion 106, in combination, form a general "T" shape.

The ground connection assembly 130 includes a fastener 134 that couples the MOV stack 128 to the system ground 132. The ground connection assembly 130 may further include a cap configured to disconnect the ground connection assembly 130 from the second housing portion 106 upon a failure of the surge arrester 100. In some embodiments, the cap includes a hole configured to allow hot gas to escape the housing 102.

The MOV stack 128 is coupled to the ground connection assembly 130 to provide an electrical connection between the system ground 132 and the metallic connector spade 122. In some embodiments, the MOV stack 128 is composed of several MOV disks joined into a single assembly. The MOV stack 128 has a resistance that changes based on the voltage of the surge arrester 100. At a normal operating voltage, the MOV stack 128 has a high resistance and restricts current from flowing through the surge arrester 100. In the case of a power surge (e.g., a lightning strike, a voltage increase, etc.), the resistance of the MOV stack 128 decreases and allows current to flow through the surge arrester 100 to the system ground 132. For example, when the current becomes greater than a current threshold (i.e., maximum current of the MOV stack 128), the surge arrester 100 begins to fail (i.e., fault to ground). When this occurs, the MOV stack 128 releases heat and, as the power surge continues for a period of time, the MOV stack 128 may continue to release dangerous hot gas and build up pressure. In some embodiments, when the dangerous hot gas builds enough internal pressure, the cap or plug of the ground connection assembly 130 may release, allowing the flames, plasma, arcing, hot gas, and MOV stack 128 to escape the housing 102.

FIG. 2 illustrates a three-phase apparatus, such as a switchgear or transformer 200 (e.g., a feedthrough transformer, a vault transformer, a pad-mounted transformer, a direct-buried transformer, a submersible transformer, and the like) according to some embodiments. The transformer 200 includes a front plate 201 situated at the end of a radial underground run. The transformer 200 includes tee connectors **204*a*, 204*b*, and 204*c* connected to a first electrical phase 202*a*, a second electrical phase 202*b*, and a third electrical phase 202*c*. The first electrical phase 202*a* may be an A phase, the second electrical phase 202*b* may be a B phase, and the third electrical phase 202*c* may be a C phase. Each phase 202*a*, 202*b*, 202*c* may be separated by a phase angle of approximately 120°. Each phase 202*a*, 202*b*, 202*c* connect to the tee connectors 204*a*, 204*b*, 204*c*** via a transformer bushing, such as a 600 A deadbreak integral transformer bushing.

The tee connectors **204*a*, 204*b*, 204*c* are connected to tee arresters 206*a*, 206*b*, 206*c* respectfully. The tee arresters 206*a*, 206*b*, 206*c* are each, for example, the surge arrester 100. The tee arresters 206*a*, 206*b*, 206*c* each have a bottom plate 208*a*, 208*b*, 208*c* connected to the system ground 132 (not shown). Additionally, the tee arresters 206*a*, 206*b*, 206*c* include the second housing portion 106 angled such that the bottom plate 208*a*, 208*b*, 208*c* faces the front plate 201. In the case the current through the tee arresters 206*a*, 206*b*, 206*c* passes a current threshold such that the MOV stack 128** melts and releases hot gas, the MOV stack 128 expulsion is directed towards the front plate 201.

Thus, the application provides, among other things, a tee-shaped surge arrester. Various features and advantages of the application are set forth in the following claims.

What is claimed is:

1. A high voltage electrical system comprising:
a transformer including a front plate;
a plurality of connectors, wherein each of the plurality of connectors is coupled to an electrical phase of a plurality of electrical phases; and
a plurality of arresters, wherein each of the plurality of arresters is coupled to one of the plurality of connectors, and wherein a housing portion of each arrester of the plurality of arresters is angled towards the front plate.

2. The high voltage electrical system of claim 1, wherein the plurality of electrical phases includes a first electrical phase, a second electrical phase, and a third electrical phase, and wherein the plurality of connectors includes a first connector coupled to the first electrical phase, a second connector coupled to the second electrical phase, and a third connector coupled to the third electrical phase.

3. The high voltage electrical system of claim 2, wherein the plurality of arresters includes a first arrester coupled to the first connector, a second arrester coupled to the second connector, and a third arrester coupled to the third connector.

4. The high voltage electrical system of claim 1, wherein each electrical phase of the plurality of electrical phases is separated by a phase angle of approximately 120°.

5. The high voltage electrical system of claim 1, wherein each of the plurality of arresters includes a metal oxide varistor (MOV) stack, wherein the MOV stack is released through an opening of the housing portion based on a fault to ground condition.

6. The high voltage electrical system of claim 5, wherein the fault to ground condition is the result of a fault current within the respective arrester being greater than a current threshold.

7. The high voltage electrical system of claim 1, wherein each of the plurality of arresters is one selected from the group consisting of a tee arrester, a deadfront arrester, a lightning arrester, a bushing arrester, a 200 A loadbreak arrester, and a 600 A deadbreak arrester.

8. The high voltage electrical system of claim 1, wherein the transformer is one selected from the group consisting of a feedthrough transformer, a vault transformer, a pad-mounted transformer, a direct-buried transformer, and a submersible transformer.

9. The high voltage electrical system of claim 1, wherein an opening of the housing portion includes a cap coupled to a ground.

10. A high voltage electrical system comprising:
a transformer including a front plate;
a plurality of connectors, wherein each of the plurality of connectors is coupled to an electrical phase of a plurality of electrical phases; and
a plurality of arresters, wherein each of the plurality of arresters is coupled to one of the plurality of connectors, and wherein a first housing portion of each arrester of the plurality of arresters is perpendicular to the front plate, and wherein a second housing portion of each arrester is angled towards the front plate.

11. The high voltage electrical system of claim 10, wherein the plurality of electrical phases includes a first electrical phase, a second electrical phase, and a third electrical phase, and wherein the plurality of connectors includes a first connector coupled to the first electrical phase, a second connector coupled to the second electrical phase, and a third connector coupled to the third electrical phase.

12. The high voltage electrical system of claim 11, wherein the plurality of arresters includes a first arrester coupled to the first connector, a second arrester coupled to the second connector, and a third arrester coupled to the third connector.

13. The high voltage electrical system of claim 10, wherein each electrical phase of the plurality of electrical phases is separated by a phase angle of approximately 120°.

14. The high voltage electrical system of claim 10, wherein each of the plurality of arresters includes a metal oxide varistor (MOV) stack, wherein the MOV stack is released through an opening of the second housing portion based on a fault to ground condition.

15. The high voltage electrical system of claim 14, wherein the fault to ground condition is the result of a fault current within the respective surge arrester being greater than a current threshold.

16. The high voltage electrical system of claim 10, wherein each of the plurality of arresters is one selected from a group consisting of a tee arrester, a deadfront arrester, a lightning arrester, a bushing arrester, a 200 A loadbreak arrester, and a 600 A deadbreak arrester.

17. The high voltage electrical system of claim 10, wherein the transformer is one selected from a group consisting of a feedthrough transformer, a vault transformer, a pad-mounted transformer, a direct-buried transformer, and a submersible transformer.

18. The high voltage electrical system of claim 10, wherein an opening of the second housing portion includes a cap coupled to a ground.

19. The high voltage electrical system of claim 10, wherein the first housing portion includes a plug interface configured to receive an insulating plug and a bushing interface configured to receive a bushing.

20. The high voltage electrical system of claim 10, wherein each of the plurality of arresters includes an elastomeric primary insulation.

* * * * *